US006581738B2

(12) United States Patent
Schäfer et al.

(10) Patent No.: US 6,581,738 B2
(45) Date of Patent: Jun. 24, 2003

(54) PARKING LOCK FOR A MOTOR VEHICLE WITH AN EMERGENCY RELEASE DEVICE

(75) Inventors: Helmut Schäfer, Ketsch (DE); Bruno Hoess, Ottersweier (DE); Peter Münch, Mannheim (DE); Klaus Zahn, Östringen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/982,679

(22) Filed: Oct. 19, 2001

(65) Prior Publication Data

US 2002/0084162 A1 Jul. 4, 2002

(30) Foreign Application Priority Data

Oct. 19, 2000 (DE) .......................... 100 52 259

(51) Int. Cl.⁷ .............................................. F16H 63/38
(52) U.S. Cl. .................. 192/13 R; 192/219.5; 192/219.7
(58) Field of Search ................... 192/13 R, 219.5, 192/219.6, 219.7, 220.6, 220.7, 13 A; 188/31

(56) References Cited

U.S. PATENT DOCUMENTS

| 3,213,968 | A | * | 10/1965 | Platz ........................ 188/69 |
| 3,601,230 | A | * | 8/1971 | Platz ........................ 188/31 |
| 5,954,179 | A | * | 9/1999 | Osborn ................... 192/219.5 |
| 5,957,806 | A | * | 9/1999 | Hirose et al. ................. 477/79 |
| 6,481,556 | B1 | * | 11/2002 | Haupt ..................... 192/219.5 |

FOREIGN PATENT DOCUMENTS

| DE | 196 43 304 | 10/1996 |
| DE | 198 34 074 | 7/1998 |

* cited by examiner

Primary Examiner—Saul Rodriguez

(57) ABSTRACT

An emergency release device for the parking lock of a motor vehicle is described which contains an locking device (46, 44,38,24,12,10) that is pressed into its engaged position by a spring element (42,50) and which can move into its disengaged position by at least one actuator (46) that is actuated by a control element (56,58) against the spring force. The locking device (46,44,38,24,12,10) can be linked with a clutch pedal located on the operator's station by releasable mechanical connecting elements (108,110,112), in such a way that it is possible to emergency-release the parking lock in case of vehicle malfunction.

8 Claims, 1 Drawing Sheet

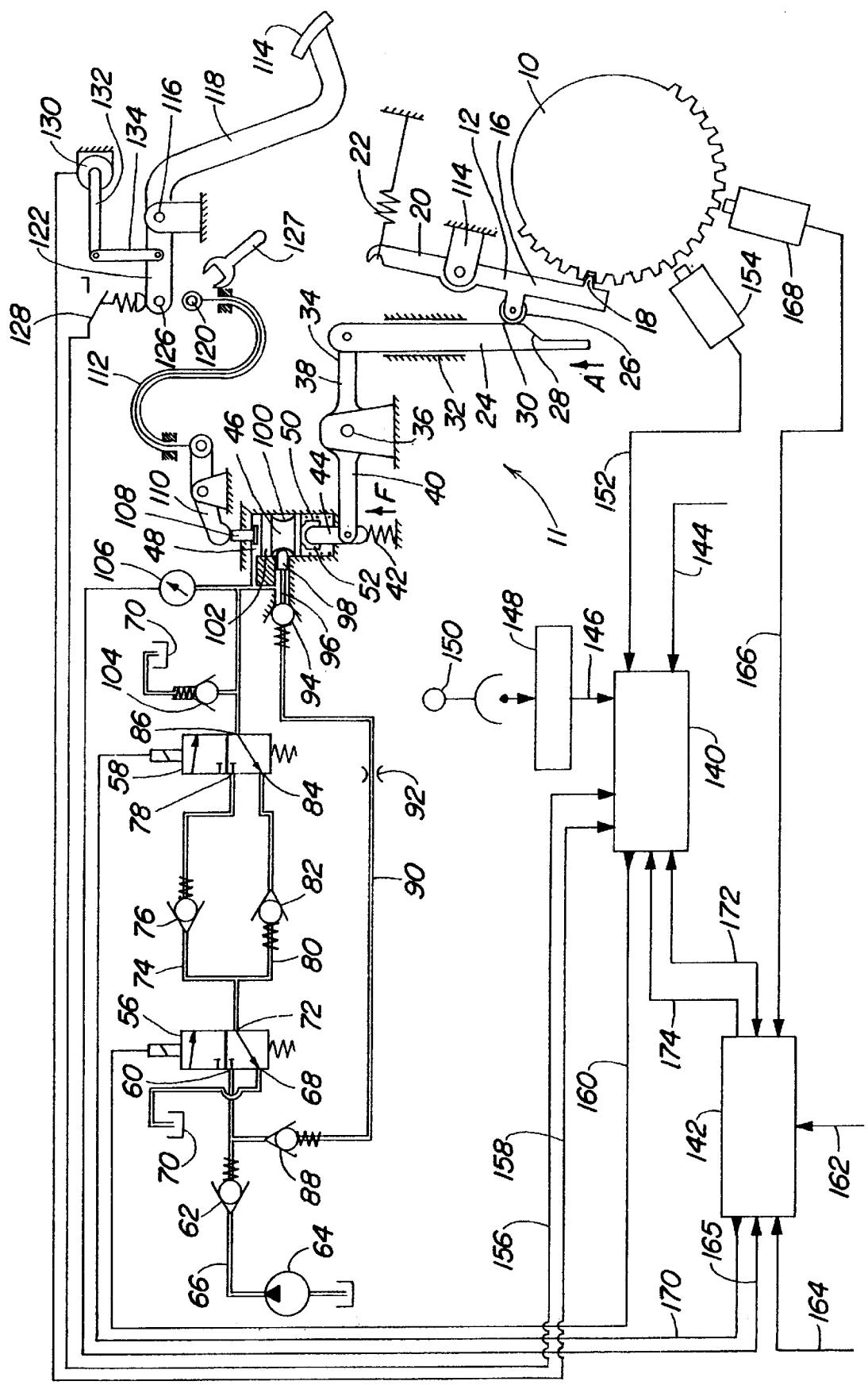

PARKING LOCK FOR A MOTOR VEHICLE WITH AN EMERGENCY RELEASE DEVICE

BACKGROUND OF THE INVENTION

The invention concerns an emergency release device for the parking lock of a motor vehicle having an operation mechanism that is pressed by a spring element into its engaged position and which can be moved against the spring force into its disengaged position by at least one actuator which is actuated by a control element. The operation mechanism can be connected with a release lever situated in the driver's cab of the vehicle or, more broadly, on an operator's platform, by means of a mechanical connecting element, in such a way that the parking lock can be released in the case of a malfunction.

In modern motor vehicle gears (synchronized, power shift, or automatic gears), the parking lock is usually inserted manually, via a mechanical rod, so as to block the rotating movement of gears or vehicle wheels, in a positive manner. In order to improve comfort, gears are made with electrically actuated gear shifting, so that the gear shifting command is carried out by the operator by pressing a button. Logically, the parking lock should also be included in this servo control. When using infinitely variable change-speed gears, which can implement a non-positive standstill by selecting an infinitely large speed increasing ratio, the parking lock actuation should be automated, so that the transition from non-positive standstill into parking position (and vice-versa) takes place without interruption of the braking effect of the motor vehicle. Therefore, efforts are being made to design the actuation of a parking lock (of a mechanical, positive locking of a toothed wheel) so that the locking and release of the parking lock is carried out by an electrical command transmission.

Such automated operations of the parking lock function are usually carried out in such a way that when the vehicle is stopped, the parking lock is engaged via a mechanical spring. When the vehicle is started, the parking lock can be disengaged, for example, electrically or hydraulically, against the force effect of the spring by means of auxiliary energy present on board. If this auxiliary energy fails, a manual emergency release is needed, so that the vehicle can be towed.

In case the work vehicle, for example, an agricultural tractor, must be moved or towed when its electric equipment, hydraulics, or driving motor fails, the provisioning of a mechanical emergency operation for the disengaging and re-engaging of the parking lock, parallel to the electro-hydraulic operation, is known. For example, DE-A-198 34 074 mentions an automatic gear, in which a lever is provided in the passenger space, which is operatively connected with a parking catch. For the operating connection, a Bowden cable is used, by means of which the transmission of undesired vibrations from the gear to the passenger compartment is to be avoided. The known solutions for an emergency actuation of the parking lock, however, do not fulfill all safety requirements for a modern work vehicle with automatic gears, so as to avoid dangers which may arise as a result of operating errors.

The goal, which is the basis of the invention, is to be found in providing an emergency release device of the type previously mentioned, by means of which, the aforementioned problems are overcome. In particular, dangers arising from operating errors are to be avoided. The emergency release device should consist of simple, low-cost elements and make possible foolproof remote control with a driving motor which is running or standing still. It should make possible a quick, simple, and easy emergency release of the parking lock.

SUMMARY OF THE INVENTION

The emergency release device according to the invention operates with the parking lock of a motor vehicle having an operation mechanism that is pressed by the retention force of spring elements into an engaged parking lock position and is moved by at least one actuator. The actuator is operated by a control element, against the retention force, into its engaged position. The operation mechanism can be releasably connected, by means of a mechanical connecting element, with a clutch pedal located on the operator's platform of the vehicle. The releasable connection is designed in such a manner that an operating connection can be established between the clutch pedal and the parking lock, in a simple manner, any time and anywhere, in order to effect an emergency release of the parking lock by operating the clutch pedal. A mechanical force introduction for the disengaging of the parking lock, which is parallel to the actuator, is produced by the connection of the clutch pedal with the parking lock.

The emergency release device, in accordance with the invention, can be implemented by very simple, low-cost components. An additional lever in the passenger space, as is provided by the state of the art, is not necessary. The coupling with the available clutch pedal reduces the danger of operating errors, because for emergency operation, for example, during towing, the parking lock can be released only with a disengaged coupling. Thus, with such a type of emergency operation, the drive train between the gear and the vehicle wheels is always interrupted. The emergency release can be undertaken, independently of whether the driving motor is running or standing still. In order to make the emergency release effective, one only has to affix a cab-side end of the connecting element to the clutch pedal. This can be done simply and quickly, anywhere and any time, perhaps with the aid of a simple tool. The parking lock of a vehicle that has developed a problem during operation can thus be released, so as to allow towing of the vehicle.

The emergency release via the clutch pedal—that is, with the power of one's foot—is advantageous from the aspect of the operating force, since the restoring springs of the operation mechanism of the parking lock must be designed especially powerful to attain a high engaging speed. These forces can easily be applied and overcome with a foot.

Advantageously, the connecting elements contain a Bowden cable, one of whose ends is affixed, directly or with the insertion of other components, to the operation mechanism. The Bowden cable is conducted to the driver's cab. Its other end is kept in the vicinity of the clutch pedal during normal operation and is not connected to the clutch pedal, so that the emergency release is not functioning.

If the emergency release is needed, for example, for the towing of a defective vehicle, the cab-side end of the Bowden cable can be connected, directly or with the insertion of other components, to the clutch pedal with a few simple moves (if necessary, with the aid of a tool). Upon connecting, the clutch pedal is at rest, which corresponds to an engaged coupling. During this installation work, the vehicle assumes a safe parking position.

To release the parking lock, the clutch pedal must then be merely depressed. The operator has to be in the driver's seat. Therefore, he has the vehicle under control at the moment the parking lock is disengaged and can, at any moment, engage the parking lock, once again, via the clutch pedal, and can also operate the lock and the steering in the usual manner. The emergency release device can be readily placed out of commission once again, in that the cab-side end of the Bowden cable is easily detached from the clutch pedal.

Basically, the connecting elements, for example, the Bowden cable, can be affixed to any arbitrary part of the operation mechanism for the parking lock. They can act, for example, on a mechanical locking rod, through which a lock handle of the parking lock is actuated.

Frequently, the parking lock, as an actuator, contains a hydraulic cylinder, whose operating piston acts on a locking rod, which is pressed into the locked position by a spring element, and presses it into the released position when the operating piston acts against the retention force of the spring element. The operating piston can be regarded as part of the operation mechanism, on which the connecting elements act in a particularly advantageous refinement of the invention. By means of this measure, the normal operation of the parking lock is not hindered, since if the emergency release is not actuated, the parking locking device reacts as usual. The operating piston is pressed against a first stop, which corresponds to the locked position, by the spring force. If the piston chamber is set under pressure, then the operating piston is pressed against a second stop, which corresponds to the released position, and the locking rod disengages the parking lock. These normal movements of the parking lock device do not lead to a movement of the emergency actuation. On the other hand, the emergency actuation can be kept permanently in the locked actuation position under the effect of force.

Advantageously, an axially movable actuation element, for example, an actuation bolt, extends through a wall of the hydraulic cylinder and is sealed off with respect to the wall. In an actuation of the actuation element, it acts on the operating piston, and moves it into its release position against the force of the spring element. This development is particularly advantageous if the locking rod of the parking lock is located within a gear housing and is thus accessible only with difficulty, whereas the hydraulic cylinder is affixed outside on the gear housing and allows easy access. The aforementioned development reduces the construction expense and facilitates later upgrading.

A simple development of the invention is given in that the actuation element projects into the piston chamber of the hydraulic cylinder and acts on the front side of the piston. Moreover, it is advantageous to provide a shift lever, whose middle area pivots on a housing part, for example, on the gear housing. One end of the Bowden cable acts on the first end of the shift lever, whereas the second end of the shift lever acts on the actuation element, so as to move it axially if necessary.

In order not to have to constantly operate the clutch pedal during a towing operation over a long stretch, locking elements are provided in accordance with a preferred refinement of the invention; by means of these locking elements, the clutch pedal can be locked in its depressed position (parking lock released). A bolt, which is stuck into the carrier of the clutch pedal by the operator, can, for example, be taken into consideration as a locking element. This locking can thus be operated by the operator, when he is on the operator's platform and keeps the clutch pedal depressed—that is, has the vehicle under control here also.

If the aforementioned locking is not used, but rather the towing operation is carried out with a depressed pedal and if the operator allows the clutch pedal to be partially engaged during the trip, due to carelessness, then there is no danger of a sudden blocking of the drive wheels, since the lock handle is turned down to low speeds of the turning toothed wheel. Moreover, the operator is warned already, in the case of the slightest contact of the tooth tips, by a loud noise and can react appropriately.

A preferred refinement of the invention provides for at least the use of a coupling sensor, which detects the position of the clutch pedal. As a coupling sensor, one can take into consideration, in particular, a position switch, which switches when the clutch pedal is depressed. In any case, coupling sensors are available, for the most part, especially with vehicles with automatic gears, and can be used for the purposes of the invention. For this reason, a special sensory mechanism is frequently not required. If the clutch pedal is depressed, the coupling sensor emits a corresponding signal to the gear control, which causes the coupling to be opened or to remain open. Thus, it is ensured, even for a towing operation with an emergency-released parking lock, that the gear remains separated from the vehicle wheels.

In the case of a vehicle with automatic gears, signal emitters, such as potentiometers and switches, on the clutch pedal emit control signals to the electronic gear control in order to place the gears on "neutral" or "free-wheel," as soon as the clutch pedal is depressed. These control signals are also produced when the clutch pedal is actuated for towing, in an emergency actuation, for example, upon loss of the parking lock function. The driving motor of the vehicle may be operating, in order to make available the supply pressure for the power steering and the power lock. Therefore, no other response sensors, which communicate to the gear control that the parking lock was manually disengaged, are needed for the emergency release of the parking lock. Improper use, via the link between the emergency release and the clutch pedal, in which the vehicle is operated with a permanently released parking lock, is not possible. Since no additional sensors are required, sensors cannot be additional potential sources of mistakes either.

The emergency release, in accordance with the invention, is robust and safe even if, in spite of the normal functioning of the electro-hydraulic actuation, the emergency release is used by mistake. The use of a Bowden cable makes possible any remote actuation. The emergency release is foolproof, since its operation rules out the normal operation of the vehicle. It can be used with the driving motor, both when it is running and when it is standing still.

BRIEF DESCRIPTION OF THE DRAWING

With the aid of the drawing, which shows an exemplified embodiment of the invention, the invention and additional advantages and advantageous refinements and developments of the invention are described and explained in more detail below. In the sole FIGURE, the functioning scheme of a control device of the invention, with hydraulic and electrical control circuits, is represented schematically.

DETAILED DESCRIPTION OF THE PREFFERED EMBODIMENT

The depicted control device can be used with a parking lock of a farm tractor. An outlet toothed wheel 10 of the vehicle gear, which is connected, rotationally fixed, with the non-depicted, driven axles and wheels of the farm tractor, can be seen in the FIGURE.

A lock mechansim 11 is provided, containing a detent pawl 12 constructed in the shape of a rocker, which is seated by means of a mount 14 free to pivot on the transmission housing or vehicle chassis, neither of which is shown. A first arm 16 of detent pawl 12 bears a tooth 18. By pivoting detent pawl 12, tooth 18 of detent pawl 12 can be brought into engagement with the teeth of output gear 10 so that a positive lock is formed and rotation of gear 10, and thus movement of the vehicle, is prevented. The tooth geometry is designed to be repellent, so that even under maximal loads (vehicle weight, slope inclination, coefficient of traction, and so on), detent pawl 12 can be safely detached from engagement with output gear 10. A restoring spring 22 acts on the other arm 20 of detent pawl 12, effecting a safe retraction of detent pawl 12 into its idle position in which its tooth 18 is not engaged with the teeth of output gear 10, so long as no additional mechanical force is exerted on detent pawl 12.

Locking device 11 can additionally contain a spring-loaded actuating shaft, the end face of which features actuating cams. During rotation of the actuating shaft, the actuating cam comes into engagement via a friction-reducing roller with a detent pawl 12 and effects a pivoting of detent pawl 12. Such a construction is known and used, for instance, in the John Deere tractors of the 6610 series. For the sake of improved comprehension, a movable bar 24 is shown in the drawing in place of the actuating shaft. On one side, bar 24 has an inclined ramp (cam) which effects a pivoting of detent pawl 12 via a friction-reducing roller 26 placed on first arm 16 of detent pawl 12. The ramp comprises an area 28 with a steeper angle, which lies in the pivot range of detent pawl 12, and an area 30 with a shallow angle, which lies in the engagement area (park position) of detent pawl 12 and minimizes the reaction of high vehicle-side loads on the actuation. By displacing bar 24 in the direction of arrow A, detent pawl 12 is moved into its disengaged position, and by pushing it back against the direction of arrow A, it is moved into its engaged position, in which area 30 with a shallower angle is engaged with roller 26 (as illustrated).

The bar 24 run in guide 32 is articulated to a first arm 34 of a beam 38 that can be swung about a stationary axis of rotation 36. Acting on second arm 40 of beam 38 is a main spring 42 which exerts a force in the direction of arrow F and presses bar 24 against the direction of arrow A into the illustrated engaged position. In contrast to previous manual actuations, locking device 11 assumes its locked (engaged) position as the default position in the absence of any additional impingement of force. This guarantees a safe vehicle state in case of failure of auxiliary power.

Also acting on arm 40 of beam 38 is the actuating shaft 44 of a hydraulic actuation piston 46. Piston 46 is housed to move freely in a borehole of the transmission housing, and delimits a piston chamber 48 with its end face facing away from actuating shaft 44. A compression spring 50 presses piston 46 in the direction of piston chamber 48. Actuating shaft 44 is not rigidly fastened to piston 46. Instead, a sliding connection 52 is provided between the two components, which permits transmission of a compressive force but not of a tensile force.

If piston chamber 48 is placed under pressure, then piston 46 moves downward against the force of compression spring 50 and presses via actuating shaft 44 on beam 38, which is pivoted against the force of main spring 42 and moves bar 24 upward. Thus, roller 26 goes from area 30 with a shallow angle into area 28 with a steeper angle and releases detent pawl 12, which is pivoted by the force of restoring spring 22 into its disengaged position.

If the pressure force in piston chamber 48 is cut off due to an engagement signal, then piston 46 reacts immediately. It is pushed upward by compression spring 50 and presses the fluid volume out of piston chamber 48. Because of the sliding connection 52 between piston 46 and actuating shaft 44, piston 46 moves independently of whether the mechanical components of locking device 11 follow the displacement of the piston.

The construction of the sliding connection 52 has a particularly advantageous effect if the tooth 18 of the detent pawl is on top of the tooth of output gear 10 (tooth on tooth) at the time of an engagement signal, so that meshing of the teeth is initially not possible. The components of locking device 11, particularly beam 38 and actuating shaft 44, then cannot assume their engaged position. Independently of this, however, piston 46 is pressed upward by the force of compression spring 50 and empties piston chamber 48, which may require a short span of time due to flow resistances of the hydraulic components controlling piston chamber 48 (depending on the oil viscosity). If an engagement of teeth then takes place by rotation of output gear 10, the components of locking device 11 can instantly follow this, without impeding the engagement motion by hydraulic flow resistances and the like. Rapid engagement of teeth is desirable to prevent output gear 10 from reaching a high rotational speed in case of strong acceleration, so that an engagement of teeth is made more difficult by the relative motion of the teeth, or is no longer possible at all.

The control of the hydraulic medium flow to and from piston chamber 48 is accomplished by two 3/2-way solenoids 56, 58, which convert electrical commands into hydraulic commands. First input 60 of first solenoid 56 is connected with the interposition of a spring-loaded input check valve 62 to a pressure supply line 66 fed by a pressure source 64. Input check valve 62 prevents backflow of hydraulic medium from first solenoid 56 to pressure supply line 66. It opens when the pressure in pressure supply line exceeds an opposing forced generated by a spring of input check valve 62. Pressure source 64 is, for instance, a hydraulic pump and the usual means for regulating pressure, which also supply other loads of the tractor, which is not shown, however.

A second input 68 of first solenoid 56 is directly connected to a hydraulic fluid sump 70. With a voltage applied, output 72 of first solenoid 56 is connected to first input 60 and without power applied, to second input 68 (as shown).

Output 72 of first solenoid 56 is connected via a first connection line 74, in which a first check valve 76 is arranged, to a first input 78 of second solenoid 58 and, via a second connection line 80, in which a second check valve 82 is arranged, to a second input 84 of second solenoid 58. First check valve 76 is spring-loaded and arranged such that it prevents a backflow from second solenoid 58 to first solenoid 56. Second check valve 82 is spring-loaded and arranged such that it prevents an inflow from first solenoid 56 to second solenoid 58.

When there is a voltage at second solenoid 58, the output of the second solenoid is connected to first input 78, and in the de-energized state of second solenoid 58, it is connected to second input 84 (as illustrated). Output 86 of second solenoid 58 is connected to piston chamber 48.

Piston chamber 48 is also connected to pressure supply line 66 via an additional valve arrangement, specifically, via input check valve 62, a pressure-maintaining check valve 88, a connection line 90, in which a throttle point 92 limiting the amount of flow is arranged, and a leakage-compensation valve 94. Pressure-maintaining check valve 88 is spring-loaded and prevents backflow of fluid from piston chamber 48 to pressure supply line 66. Leakage-compensation valve 94 is a spring-loaded check valve that ordinarily prevents fluid flow into piston chamber 48 and can be opened by a connecting link influenced by piston 46. The connecting link contains a control pin 96, the head 98 of which is engaged in an annular groove 100 of piston 46 so long as piston 46 is in its non-pressurized idle position (as illustrated). In this position of control pin 96, leakage-compensation valve 94 is closed. When piston 46 moves downward in piston chamber 48 due to an elevation of pressure, control pin 96 is pressed out of annular groove 100 and slides onto shoulder 102 of piston 46 facing piston chamber 48. In the process, control pin 96 is displaced and opens leakage-compensation valve 94, creating a connection between pressure supply line 66 and piston chamber 48. The flow of pressure medium is limited by throttle point 92, however, and suffices only to compensate for leakage losses. If piston chamber 48 is connected to non-pressurized sump 70 via solenoids 56, 58, the pressure in piston chamber 48 drops, piston 46 moves upward, control pin 96 slides into annular groove 100, and leakage-compensation valve 94 closes by its spring force, so that piston chamber 48 is cut off from pressure supply line 66.

Piston chamber 48 is connected via a drain valve 104 to sump 70. If piston chamber 48 is non-pressurized, drain valve 104, constructed in the manner of a check valve, is opened by spring force. Via drain valve 104, a certain amount of leakage fluid can therefore be removed when the parking lock is engaged while piston chamber 48 is non-pressurized. If the two solenoids 56, 58 are turned on, and thus the connection from pressure supply 64 to piston chamber 48 is created, then drain valve 104 is closed by the flow force of the escaping fluid so that the pressure in piston chamber 48 rises and the parking lock is disengaged.

The pressure of piston chamber 48 is detected by a pressure sensor 106 and converted into electric signals. The pressure signal issued by pressure sensor 106 essentially reflects the respective position of piston 46 and thus also the position of locking device 11.

A manually operable mechanical emergency actuation system for the parking lock is provided, with which the parking lock can be disengaged when there is a malfunction, for instance, in the electrical or hydraulic power supply. An emergency actuation may, for instance, be necessary for towing away the vehicle. The emergency actuation device acts on piston 46 and is led by way of control rods or a Bowden cable into the cabin and can be operated there by way of suitable levers or pedals by the-person operating the vehicle. This operation must be locked in the cabin for towing. The mechanical parking lock is designed so that the normal movements of the parking lock device as described above do not cause any movement of the emergency actuation device. This is assured by appropriate lost motion or freewheel functions.

The emergency actuation device illustrated contains an actuating bar 108 which acts on the end face of piston 46 and can be operated by way of a deflecting lever 110 and a Bowden cable 112. The lead through of actuating bar 108 from piston chamber 48 to the outside is sealed in an appropriate manner. Stroke motions of piston 46 when engaging and disengaging the parking lock are not transferred to the actuating bar, shown in its idle position.

A vehicle clutch pedal 114, fastened to a pedal lever 118 mounted on a stationary rotational shaft 116, is illustrated. The clutch pedal 114 can be used for an emergency actuation of the parking lock by connecting upper end 120 of Bowden cable 112 to free end 122 of pedal lever 118. To accomplish this, a hole in Bowden cable 112, for instance, is suspended from a bolt 126 projecting from free end 122 of pedal lever 118 and secured if desired. A symbolically illustrated tool 127 can be used for the suspension and securing.

Upon actuation of clutch pedal 114, the suspended end 120 of Bowden cable 112 is pulled upward. In the process, deflection lever 110 pivots and presses actuating bar 108 downward, so that piston 46 pulls bar 24 upward via beam 40, so that roller 26 of detent pawl 12 moves into the area 28 with a steeper angle and detent pawl 12 is moved by restoring spring 22 out of its engaged position (shown) and into its disengaged position. When clutch pedal 114 is relieved of pressure, pedal lever 118 assumes its home position as shown, into which it is pushed by an ordinary clutch pedal restoring spring. Under the force of main spring 42, beam 38 pushes bar 24 downward, so that roller 26 moves into the area 30 with a shallow angle and presses detent pawl 12 into its engaged position.

As an alternative to the Bowden cable 112, a link can be coupled to the first arm 34 of the beam 38. The link can be provided with a slot to allow lost motion of the beam 38 during normal operation of the control device to engage and disengage the park lock without affecting the emergency actuation device.

In order that clutch pedal 114 need not be operated constantly during a towing process, it can be locked in the actuated position by suitable measures. This is accomplished, for instance, by a locking bolt, not shown, which immobilizes pedal lever 118 in relation to the vehicle chassis.

The position of pedal lever 118 is detected by an electrical position sensor 130, which is connected to the free end 122 of pedal lever 118 and issues an analog signal corresponding to the respective position of pedal lever 118. The sensor 130 may be a rotary potentiometer connected to rotating shaft 116. In the embodiment as illustrated, a rotary potentiometer 130 is shown, which is connected by a rotating arm 132 and a link 134 to free end 122 of pedal lever 118.

If clutch pedal 114 has not been operated and the free end 122 of pedal lever 118 is in its home position, position switch 128 is open. It closes as soon as clutch pedal 114 has been pushed all the way down. When clutch pedal 114 is used for emergency actuation of the parking lock, the output signal of position switch 128 (closed position) thus indicates whether the parking lock has been cancelled.

Particularly for vehicles with infinitely variable transmissions, the position of the clutch pedal is frequently monitored by a transmission controller by means of position sensors and position switches, in order to shift the transmission automatically into neutral as soon as clutch pedal 114 is operated. It is advantageous to use these already existing components for emergency actuation. The use of clutch pedal 118 for emergency actuation is also advantageous because large forces can be transmitted to locking device 11 by operation with the foot, so that the force of main spring 42 can be effortlessly overcome.

To trigger the two solenoids 56, 58, an electronic main or transmission controller 140 and a backup or parking lock controller 142 are provided. Main controller 140 is connected via line 144 to the ignition switch of the vehicle, not shown, as well as via line 146 to a vehicle controller 148, which in turn detects the position of an operating lever 150. Via line 152, main controller 140 receives signals from a first rpm sensor 154, which detects the speed of output gear 10, as well as receiving, via lines 156 and 158, signals from position switch 128 and rotary potentiometer 130 which detect the position of clutch pedal 114. Main controller 140 triggers first solenoid 56 via line 160.

Backup controller 142 is directly connected via line 162 to the battery, not shown. It is also connected via line 164 to the ignition switch, not shown. Via line 165, backup controller 142 receives signals from pressure sensor 106 as well as, via line 166, signals from a second rpm sensor 168, which detects the speed of output gear 10 independently of first rpm sensor 154. Backup controller 142 triggers second solenoid 58 via line 170. Via a CAN bus 172, main controller 140 and backup controller 142 exchange data with one another. For reasons of redundancy, backup controller 142 communicates the rpm ascertained by second rpm sensor 168 to main controller 140 via a line 174.

Main controller 140 issues signals for engaging the parking lock (no current flow) or disengaging it (current flow) to solenoids 56, 58. The command for this comes either from the operator, via operating lever 150, vehicle controller 148 and line 146, or it results from safety-relevant measured parameters that are processed in main controller 140. The command for engaging or disengaging the parking lock is routed by main controller 140 directly to first solenoid 56, and indirectly via line 174 and backup controller 142, which performs additional checks, to second solenoid 58.

If both solenoids 56, 58 are de-energized, then the valve positions shown in the drawing result, with which piston chamber 48 is connected to sump 70 via second solenoid 58, second check valve 82 and first solenoid 56. Piston 46 is also in its upper position due to the force of compression spring 50, and locking device 11 is pushed by main spring 42 into the illustrated engaged position. Drain valve 104 is opened by its spring and likewise allows a direct pressure equalization between piston chamber 48 and sump 70.

If, while first solenoid 56 is de-energized, only second solenoid 58 is supplied with power, then it changes over and connects its input 78 to its output 86. But since first solenoid 56 blocks the inflow from the pressure supply and since lines 74 and 80 are still connected to the sump and drain valve 104 remains open, this does not change the position of piston 46 at all.

If, while second solenoid 58 is de-energized, only first solenoid 56 is supplied with power, then it changes over and connects its first input 60 to its output 72. Now the system pressure is indeed present in connection line 80, but second check valve 82 prevents fluid inflow to piston chamber 48. The backflow from piston chamber 48 to sump 70 via 86, 84, 82, 80, 72 is blocked in this state but pressure is present at input 78 of second solenoid 58 which, via an internal leakage of solenoid 58, causes a slight leakage flow into piston chamber 48. This slight amount of leakage is diverted via the open drain valve 104 to sump 70, so that pressure that would cause an unexpected disengagement of the parking lock cannot build up in piston chamber 48. In this case as well, there is no change in the engaged state of the parking lock.

If both solenoids 56, 58 are supplied with power, however, and switch from the illustrated position into their excited positions, then the system pressure of pressure supply line 66 is fed to input check valve 62, first solenoid 56, and second solenoid 58 to piston chamber 48 and moves piston 46 downward against the force of compression spring 50 and main spring 42. In this case, locking device 11 moves from its engaged into its disengaged position. Due to the presence of a fluid flow, drain valve 104 closes. In this piston position, control pin 96 is pressed by collar 102 of piston 46 out of annular groove 100 and opens leakage compensation valve 94, so that the system pressure is also present at piston chamber 48 via connection line 90, in which pressure-maintaining check valve 88, throttle point 92 and leakage-compensation valve 94 are arranged.

If, with an excited second solenoid 58 (i.e., with power applied), only first solenoid 56 is cut off from power, then it changes over and connects its second input 68 to its output 72. Output 72 is indeed now connected to sump 70, but first check valve 76 prevents a backflow of fluid from piston chamber 48. The latter continues to be connected to pressure supply line 66 via connection line 90. The disengaged state of the parking lock does not change at all.

If, with an excited first solenoid 56, only second solenoid 58 is cut off from power, then it changes over and connects its second input 84 to its output 86. Under the effect of second check valve 82, a fluid flow from pressure supply line 66 to piston chamber 48 is no longer possible. Piston chamber 48 is still connected to pressure supply line 66 via connection line 90, however. The disengaged state of the parking lock does not change at all.

Independently of the position of solenoids 56, 58, an outflow of fluid from piston chamber 48 into pressure supply line 66 is prevented by input check valve 62, so that pressure built up in piston chamber 48 does not decrease because of an unintentional pressure drop in pressure supply line 62. Pressure-maintaining check valve 88 prevents fluid flow from piston chamber 48 through input 60 to input 68 via internal leakage of first solenoid 56, and thus to sump 70. Particularly in case of a loss of system pressure during travel, a residual leakage from piston chamber to sump 70 can appear, more specifically, via internal leakage of second solenoid 58 (from output 86 to input 84), check valve 82 and an internal leakage of first solenoid 56 (from output 72 to input 68). With an appropriate design of solenoids 56, 58, this leakage is so slight that, even at high oil temperature (low viscosity), sufficient pressure can be maintained in piston chamber 48 for roughly 10 min that an engagement of the parking lock does not occur.

If both solenoids 56, 58 are changed over from their excited state into their de-energized state, then piston chamber 48 is connected via second solenoid 58, second check valve 82 and first solenoid 56 to sump 70, so that an outflow of fluid from piston chamber 48 to sump 70 takes place. Throttle point 92 limits the fluid flow through connection line 90 so that it does not suffice to maintain the pressure in piston chamber 48. Piston 46 moves upward, control pin 96 slides into annular groove 100 and leakage-compensation valve 94 closes, so that the flow of fluid back via connection line 90 is interrupted. Drain valve 104 opens. At the same time, locking device 11 engages the parking lock.

Thus, a changeover of the parking lock function (pressurization or depressurization of the piston chamber) takes place only if both solenoids 56, 58 are switched in the same sense, that is, if controllers 140, 142 issue corresponding changeover signals to solenoids 56, 58.

If no malfunction is present, main controller 140 emits a current signal to excite first solenoid 56 and backup controller 142 emits a current signal to excite second solenoid 58. If shift lever 150 is brought into its park position and the speed of output gear 10 as detected by rpm sensors 154, 168 lies below a specifiable value, the flow of current to first solenoid 56 is interrupted by main controller 140. If the speed of output gear 10 as detected by rpm sensor 168 lies below a specifiable value, the flow of current to second solenoid 58 is interrupted by backup controller 142.

Because main controller 140 and backup controller 142 receive independent rpm signals of the vehicle drive system from the two rpm sensors 154 and 168, it is a redundant system to prevent a defective controller 140, 142 or a defective rpm sensor 154, 168 from causing an unintended engagement of the parking lock above a specified travel speed.

By directly supplying power to backup controller 142 from the battery, it is guaranteed that turning the ignition off during travel does not lead to the engagement of the parking lock because second solenoid 58 then receives no signal to change over. Line 164 from the ignition key to backup controller 142 serves only as a wake-up signal for backup controller 142. The two controllers 140, 142 are connected via a communications bus 174 that permits mutual monitoring.

At all times, pressure sensor 106 supplies backup controller 142 with a report on the actual position of the parking lock. Above an upper pressure threshold (15 bar, for instance), the parking lock is considered disengaged (unlocked). It is reasonable for the lower pressure threshold to lie beneath a pressure that results from the spring force of compression spring 50 and the piston [face] surface area of piston 46, so that pressure falls below this level only when piston 46 contacts the stopping point for the engaged position, even if the mechanical linkage of locking device 11 is blocked in the tooth-on-tooth position and has not (yet) engaged.

If the emergency actuation is used for towing, for instance, when the parking lock is not functioning and at the same time the diesel engine is to be operative (in order to provide, for instance, the supply pressure for servo-assisted steering and braking), main controller 140, constructed as a transmission controller, receives, via position switch 128 and rotary potentiometer 130 on the clutch pedal, the request to set the transmission to "neutral." Reliably and without additional sensors, this prevents the vehicle from being operated with a permanently manually disengaged parking lock. Position switch 128 and rotary potentiometer 130 can thus be used for controlling the transmission and for controlling the emergency operation.

The output gear 10, the detent pawl 12, the bar 24, the beam 38, the actuating shaft 44 and the actuation piston 46 together comprising the locking device 11. Springs 42 and/or 50 constitute a spring element that presses the locking device 11 into its engaged, parking lock applied, position. The actuation piston 46 serves as an actuator to move the locking device into its disengaged position. The piston is operated by the solenoids 56, 58 that serve as control elements. The emergency release device includes the actuating bar 108, lever 110 and the Bowden cable 112. The cable 112 is connected to the clutch pedal 114 through a releasable connection by placing the cable end 120 on the bolt 126 on the pedal lever 118.

Even though the invention has been described only with the aid of one exemplified embodiment, many different types of alternatives, modifications, and variants, which fall under the invention under consideration, are opened up for the expert in light of the preceding description and drawing.

What is claimed is:

1. A parking lock of a motor vehicle having an operator's platform with a clutch pedal, the parking lock comprising a locking device, a spring element that presses the locking device into its engaged position, the locking device including at least one actuator to move the locking device into its disengaged position, a control element to operate the actuator against the spring force, and an emergency release device wherein the locking device is linked with a clutch pedal of the vehicle located on an operator's station of the vehicle through a releasable connection by means of which it is possible to emergency-release the parking lock.

2. The parking lock according to claim 1 wherein the emergency release device includes a Bowden cable whose one end, directly or indirectly, acts on the locking device and whose other end can be affixed, for an emergency actuation, directly or indirectly, to the clutch pedal.

3. The parking lock according to claim 1 wherein the locking device contains a locking rod and an actuation piston which acts on the locking rod and is part of a hydraulic cylinder, designed as the actuator, and that the emergency release device acts on the actuation piston.

4. The parking lock according to claim 3 wherein the emergency release device includes an actuation element that extends through a wall of the cylinder and is sealed off with respect to the wall and which can act on the actuation piston to move the actuation piston into its released position against the force of the spring element.

5. The parking lock according to claim 4 wherein the actuation element protrudes into the piston chamber of the hydraulic cylinder and engages the piston.

6. The parking lock according to claim 4 wherein the emergency release device includes a deflecting lever pivotally mounted at a mid-point on a housing and on whose one lever end, an end of a Bowden cable acts and whose other end acts on the actuating element in the sense of an axial movement.

7. The parking lock according to claim 1 further comprising at least one coupling sensor for the detection of the position of the clutch pedal.

8. The parking lock according to claim 7 wherein the at least one coupling sensor includes a position switch that is actuated when the clutch pedal is depressed.

* * * * *